United States Patent
Totsuka et al.

(10) Patent No.: US 11,050,312 B2
(45) Date of Patent: Jun. 29, 2021

(54) ROTARY ELECTRIC MACHINE HAVING TEMPERATURE SENSOR FOR COILS AND MANUFACTURING METHOD THEREOF

(71) Applicant: Mitsubishi Electric Corporation, Tokyo (JP)

(72) Inventors: Fumitaka Totsuka, Tokyo (JP); Hironori Tsuiki, Tokyo (JP); Yuki Yamamoto, Tokyo (JP); Takanori Onoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 18 days.

(21) Appl. No.: 16/442,632

(22) Filed: Jun. 17, 2019

(65) Prior Publication Data
US 2020/0169135 A1 May 28, 2020

(30) Foreign Application Priority Data

Nov. 28, 2018 (JP) .............................. JP2018-221905

(51) Int. Cl.
*H02K 3/04* (2006.01)
*H02K 15/02* (2006.01)
(Continued)

(52) U.S. Cl.
CPC .................. *H02K 3/04* (2013.01); *H02K 5/04* (2013.01); *H02K 15/02* (2013.01); *H02P 29/64* (2016.02);
(Continued)

(58) Field of Classification Search
CPC ............ H02K 3/04; H02K 3/34; H02K 3/345; H02K 5/04; H02K 11/20; H02K 11/25; H02K 15/02; H02P 29/64
(Continued)

(56) References Cited

U.S. PATENT DOCUMENTS 9,831,749 B2 * 11/2017 Hoshina ................... H02K 3/28
2013/0106251 A1 5/2013 Kaneshige et al.
(Continued)

FOREIGN PATENT DOCUMENTS

JP 2002-112483 A 4/2002
JP 2005-229678 A 8/2005
(Continued)

OTHER PUBLICATIONS

Communication dated Dec. 17, 2019, from the Japanese Patent Office in Application No. 2018-221905.

*Primary Examiner* — Tulsidas C Patel
*Assistant Examiner* — Rashad H Johnson
(74) *Attorney, Agent, or Firm* — Sughrue Mion, PLLC; Richard C. Turner

(57) ABSTRACT

A stator includes an iron core cylindrical part, multiple teeth, and a coil. The iron core cylindrical part has multiple circular arc-shaped core back parts. The teeth radially inwardly protrude from an inner circumferential wall surface of the iron core cylindrical part. The coil is wound around each of the teeth. A first coil and a second coil are disposed so as to hold a temperature measuring element therebetween. The first coil has an outer surface provided with a gap made of a recess or a space, which is formed by skipping winding a coil wire. The temperature measuring element for measuring temperature of the coil is inserted in the gap and is assembled.

9 Claims, 13 Drawing Sheets

(51) Int. Cl.
  *H02P 29/64*  (2016.01)
  *H02K 5/04*   (2006.01)
  H02K 11/20   (2016.01)
  H02K 11/25   (2016.01)
  H02K 3/34    (2006.01)

(52) U.S. Cl.
  CPC .............. *H02K 3/34* (2013.01); *H02K 3/345* (2013.01); *H02K 11/20* (2016.01); *H02K 11/25* (2016.01)

(58) Field of Classification Search
  USPC ........................................ 310/68 C, 203, 208
  See application file for complete search history.

(56) References Cited

U.S. PATENT DOCUMENTS

| | | | |
|---|---|---|---|
| 2013/0320817 A1* | 12/2013 | Marschall | H02K 11/0094 310/68 C |
| 2014/0254632 A1 | 9/2014 | Kaneshige et al. | |
| 2015/0078418 A1* | 3/2015 | Suzuki | G01K 1/16 374/152 |
| 2017/0054346 A1* | 2/2017 | Matsumoto | H02K 1/146 |
| 2020/0044516 A1* | 2/2020 | Dunn | H02K 7/006 |

FOREIGN PATENT DOCUMENTS

| | | | |
|---|---|---|---|
| JP | 2010-252508 A | 11/2010 | |
| JP | 2012-186902 A | 9/2012 | |
| JP | 2017-50909 A | 3/2017 | |
| JP | 2018-38209 A | 3/2018 | |
| WO | 2011/117985 A1 | 9/2011 | |
| WO | 2016/035137 A1 | 3/2016 | |

\* cited by examiner

ROTARY ELECTRIC MACHINE HAVING TEMPERATURE SENSOR FOR COILS AND MANUFACTURING METHOD THEREOF

BACKGROUND OF THE INVENTION

Field of the Invention

The present application relates to the field of a rotary electric machine having a temperature measuring element for measuring temperature of a coil and a manufacturing method thereof.

Description of the Related Art

A rotary electric machine may include a stator that has a pair of adjacent divided iron cores with teeth. The teeth are wound with coils between which a temperature measuring element is disposed. The temperature measuring element is brought into contact with one of the coils and has an elastic insulating material that is disposed between the temperature measuring element and the other coil. In this publicly known structure, the elastic insulating member presses the temperature measuring element against the one coil so that the temperature measuring element will be brought into contact with the one coil. Such a structure is disclosed in, for example, Patent Document 1.

Patent Document 1: JP-A-2012-186902

In such a conventional rotary electric machine, the temperature measuring element is easily dislocated relative to the coil when being pressed against the coil by the elastic insulating member, and thus, assembling characteristic and accuracy of temperature measurement tend to be deteriorated. To dispose the temperature measuring element and the elastic insulating member between the pair of the adjacent coils, a space for disposing these components is necessary, thereby decreasing a number of layers of the wound coil, resulting in decrease in a space factor.

SUMMARY OF THE INVENTION

The present application has been made to solve the problem and an object of the present application is to provide a rotary electric machine having an improved assembling characteristic of a temperature measuring element, an improved accuracy of temperature measurement, and an improved winding space factor and also to provide a manufacturing method thereof.

A rotary electric machine disclosed in the present application includes a stator having a cylindrical shape, a rotor coaxially disposed with the stator on an inner circumferential side of the stator, and a temperature measuring element that measures temperature of a coil wound around the stator. The stator includes an iron core cylindrical part, multiple teeth that radially inwardly protrude from an inner circumferential wall surface of the iron core cylindrical part, and the coil wound around each of the teeth. The coil wound around one of the multiple teeth is provided with a gap by making a recess on a part of an outer surface of the coil. The temperature measuring element is disposed in the gap.

A manufacturing method for manufacturing the rotary electric machine disclosed in the present application includes forming the gap by making the recess on the part of the outer surface of the coil. The recess is formed by skipping winding the coil wire by a width of at least one coil wire on the outer surface of the coil in winding the coil wire in a staggered arrangement around an outside of the tooth. The manufacturing method also includes inserting and securing the temperature measuring element in the gap.

The rotary electric machine disclosed in the present application includes the temperature measuring element that is disposed in the gap on the outer surface of the coil. Thus, positioning of the temperature measuring element to the coil is easy, thereby improving assembling characteristic. Moreover, the temperature measuring element is disposed in contact with the coil, thereby improving measurement accuracy. Furthermore, the temperature measuring element is assembled to the coil without disposing a special securing part, and therefore, a coil space factor is improved accordingly.

The manufacturing method for manufacturing the rotary electric machine disclosed in the present application includes providing the gap by skipping winding the coil wire in winding and inserting the temperature measuring element in the gap. Thus, the gap is easily provided, and the temperature measuring element is easily disposed between adjacent coils, thereby improving productivity and assembling characteristic.

The foregoing and other objects, features, aspects, and advantages of the present disclosure will become more apparent from the following detailed description of the preferred embodiments when taken in conjunction with the accompanying drawings.

DETAILED DESCRIPTION OF THE PREFERRED EMBODIMENTS

First Embodiment

A rotary electric machine according to the first embodiment of the present application is described with reference to FIGS. 1 to 8. A rotary electric machine 100 according to the present application is used in, for example, a generator, an electric motor, and a motor generator. The rotary electric machine 100 includes a stator 10 that has a coil 16 of which the temperature is measured by a temperature measuring element 19.

Figure 1:
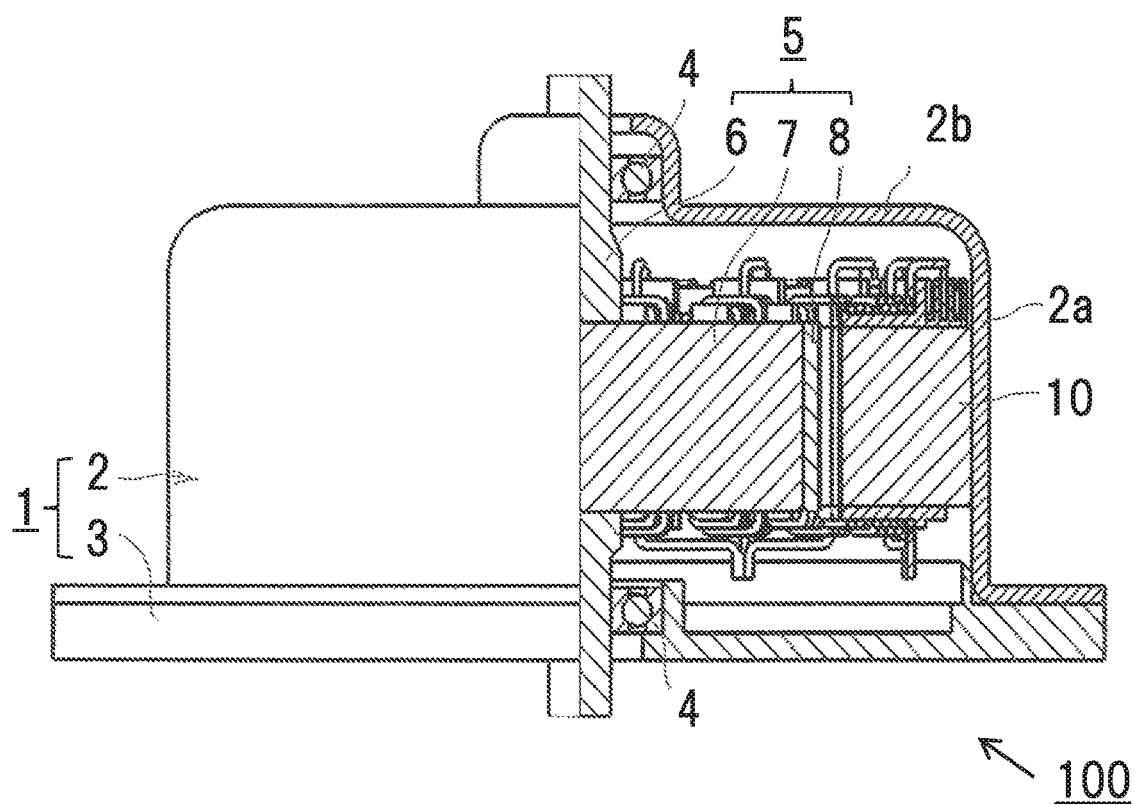
FIG. 1 is a sectional side view showing a main part of a rotary electric machine according to a first embodiment.
Figure 2:
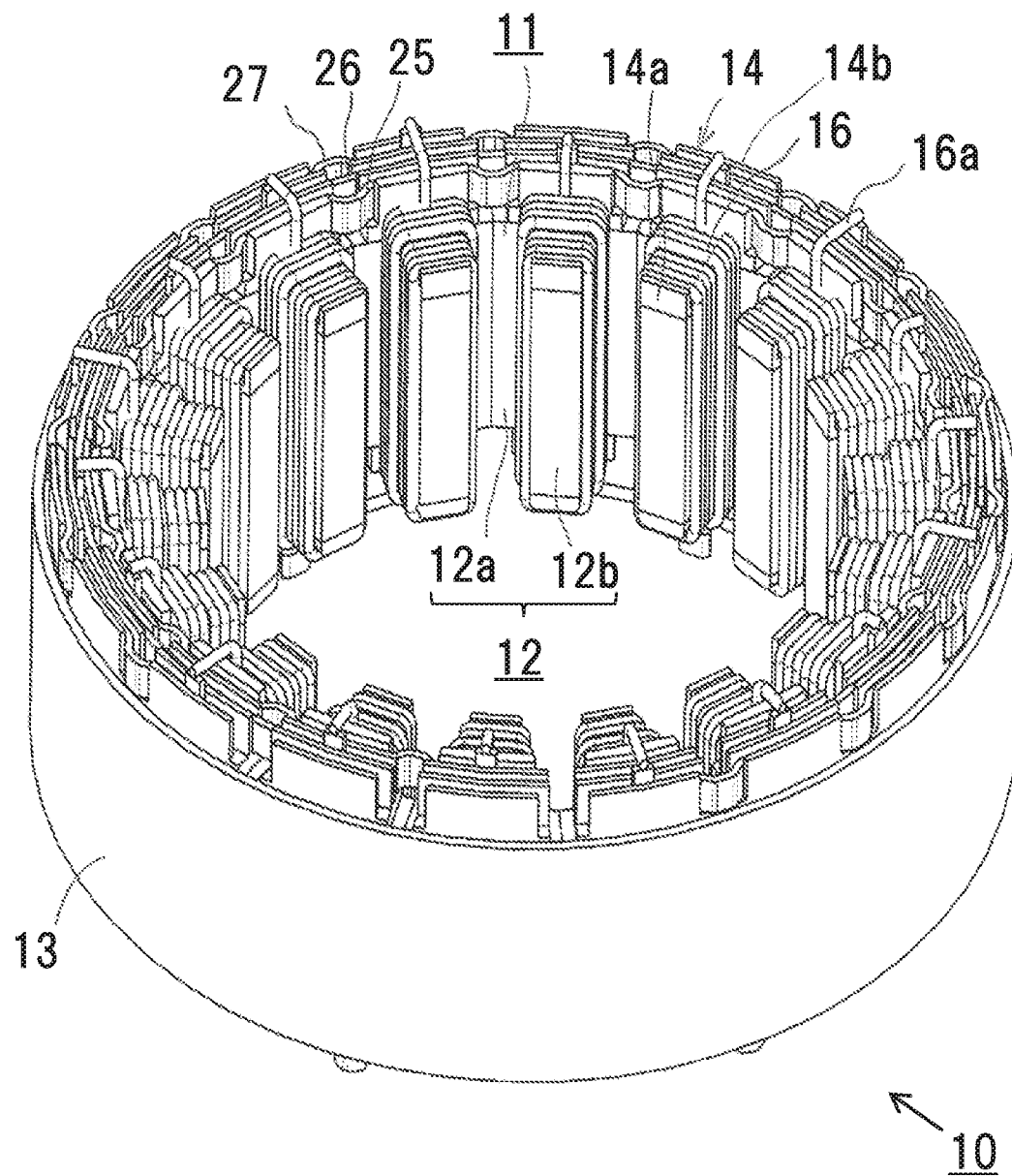
FIG. 2 is a perspective view of a stator of the rotary electric machine according to the first embodiment as viewed from one end side in an axial direction.
Figure 3:
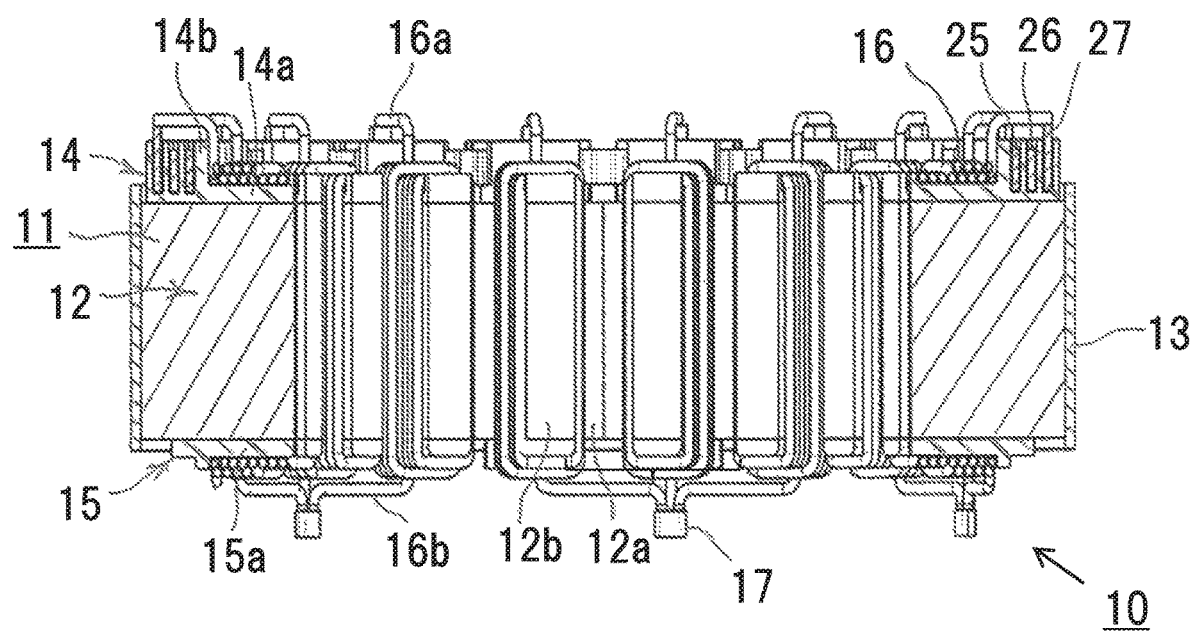
FIG. 3 is a sectional view showing the stator of the rotary electric machine according to the first embodiment.
Figure 4:
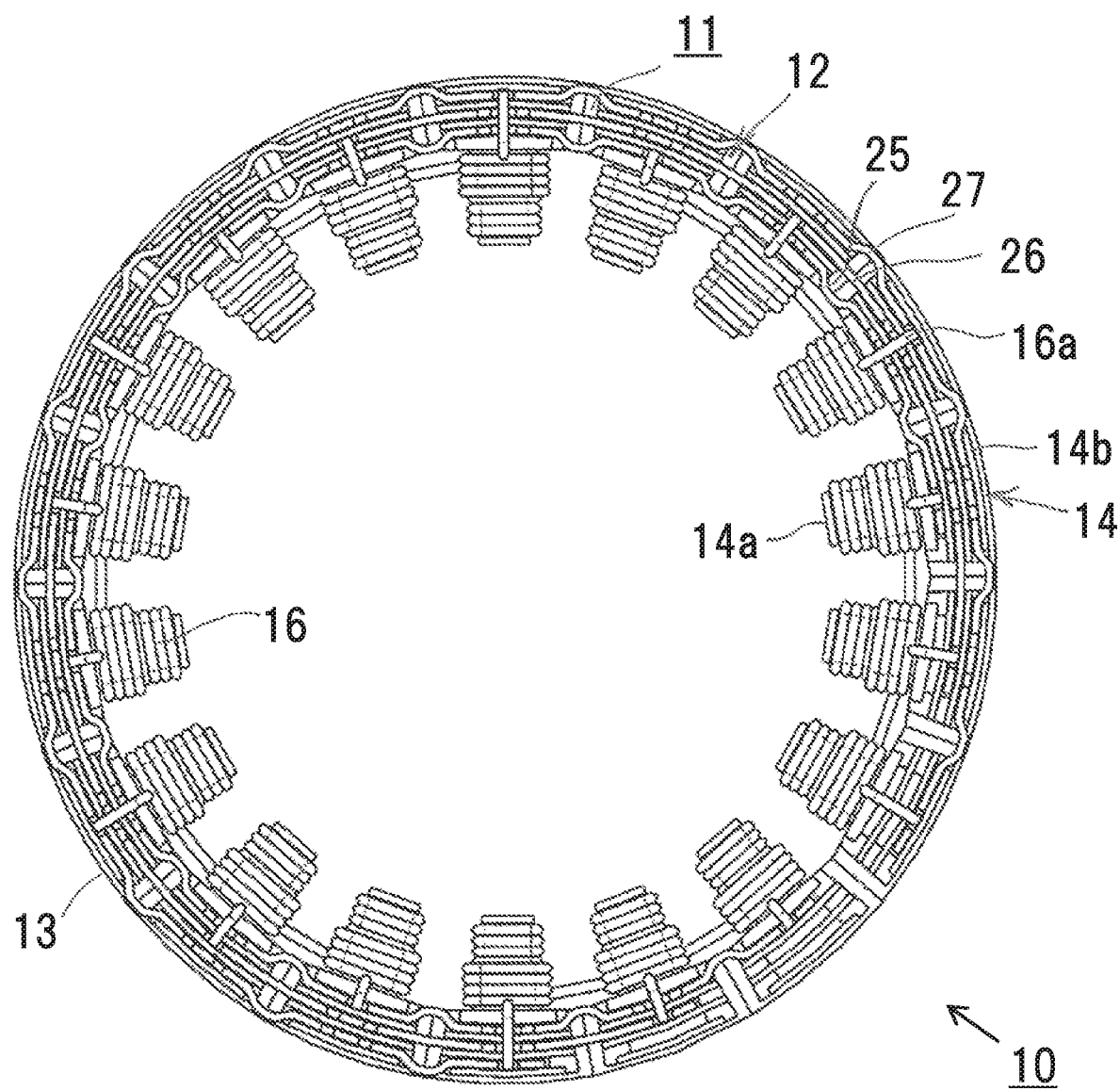
FIG. 4 is a plan view of the stator of the rotary electric machine according to the first embodiment as viewed from the one end side in the axial direction.
Figure 5:
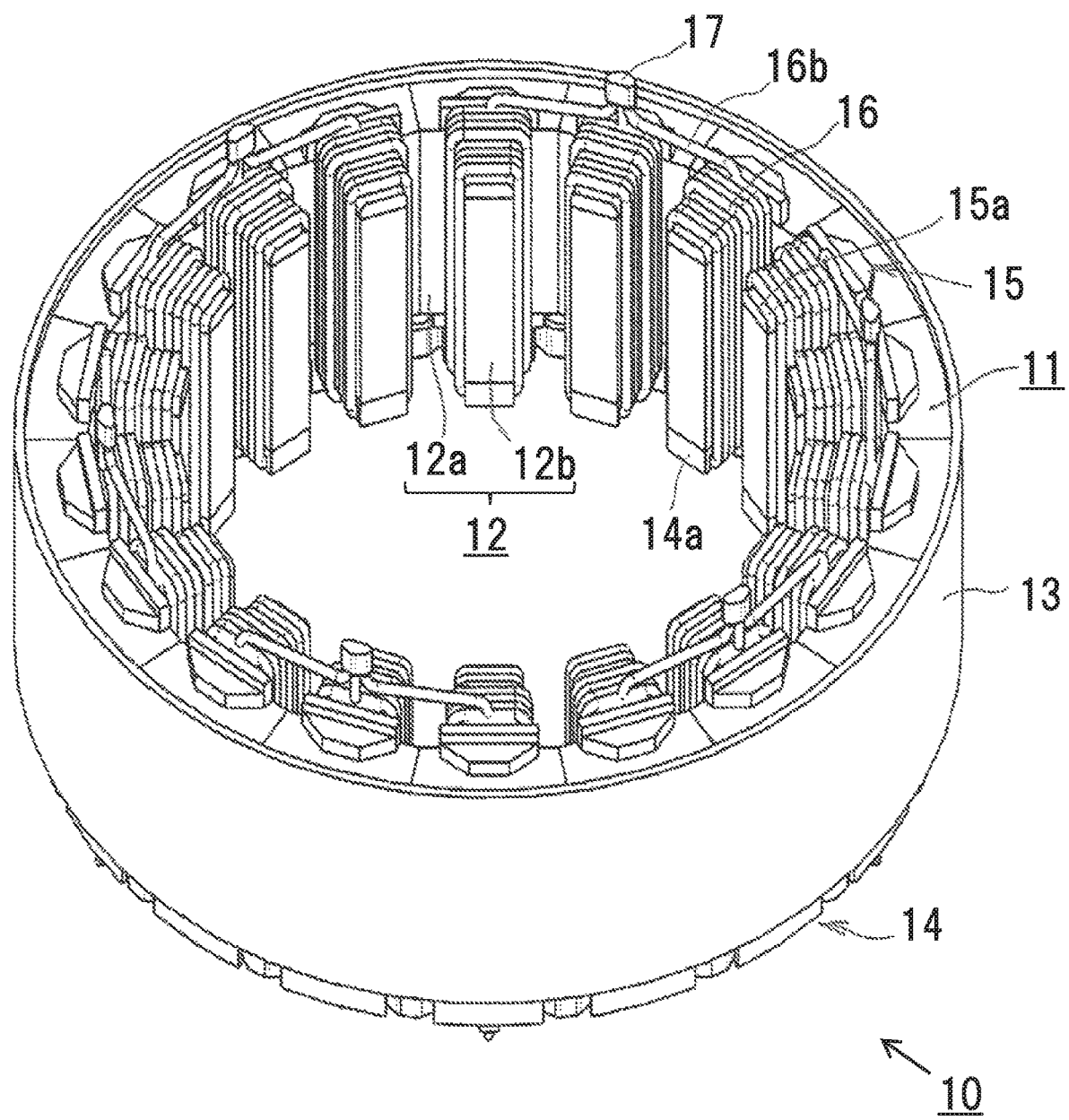
FIG. 5 is a perspective view of the stator of the rotary electric machine according to the first embodiment as viewed from the other end side in the axial direction.
Figure 6:
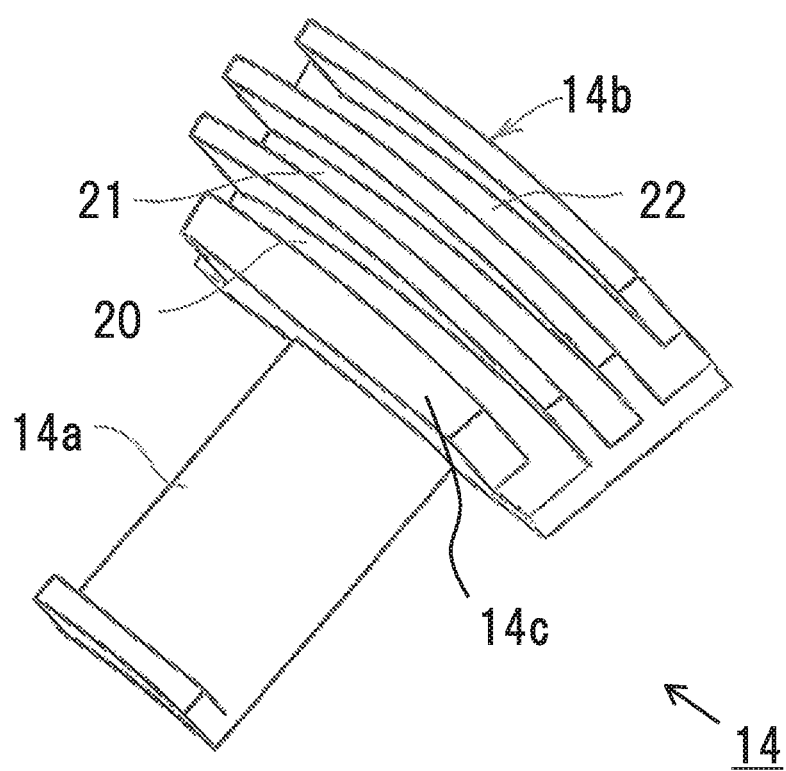
FIG. 6 is a perspective view showing a bobbin to be used in the stator of the rotary electric machine according to the first embodiment.
Figure 7:
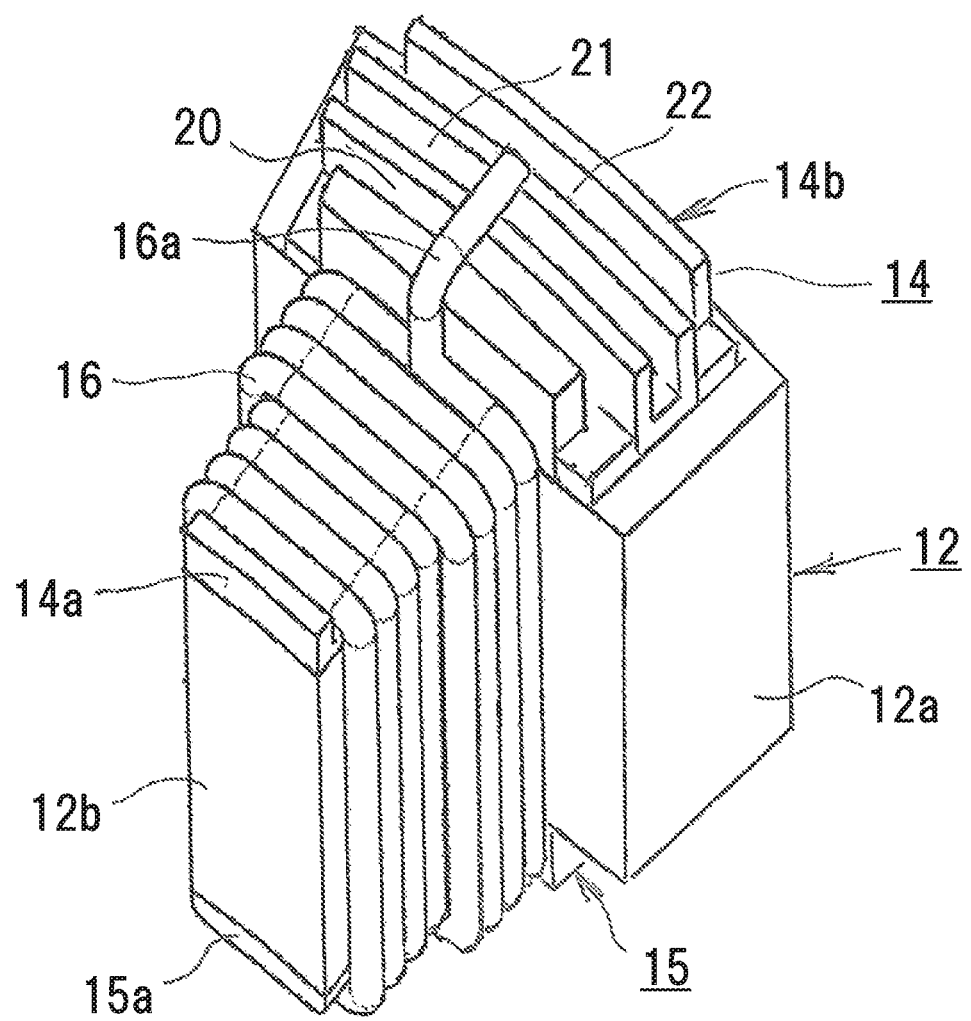
FIG. 7 is a perspective view showing a divided iron core wound with a coil, of the stator of the rotary electric machine according to the first embodiment.
Figure 8:
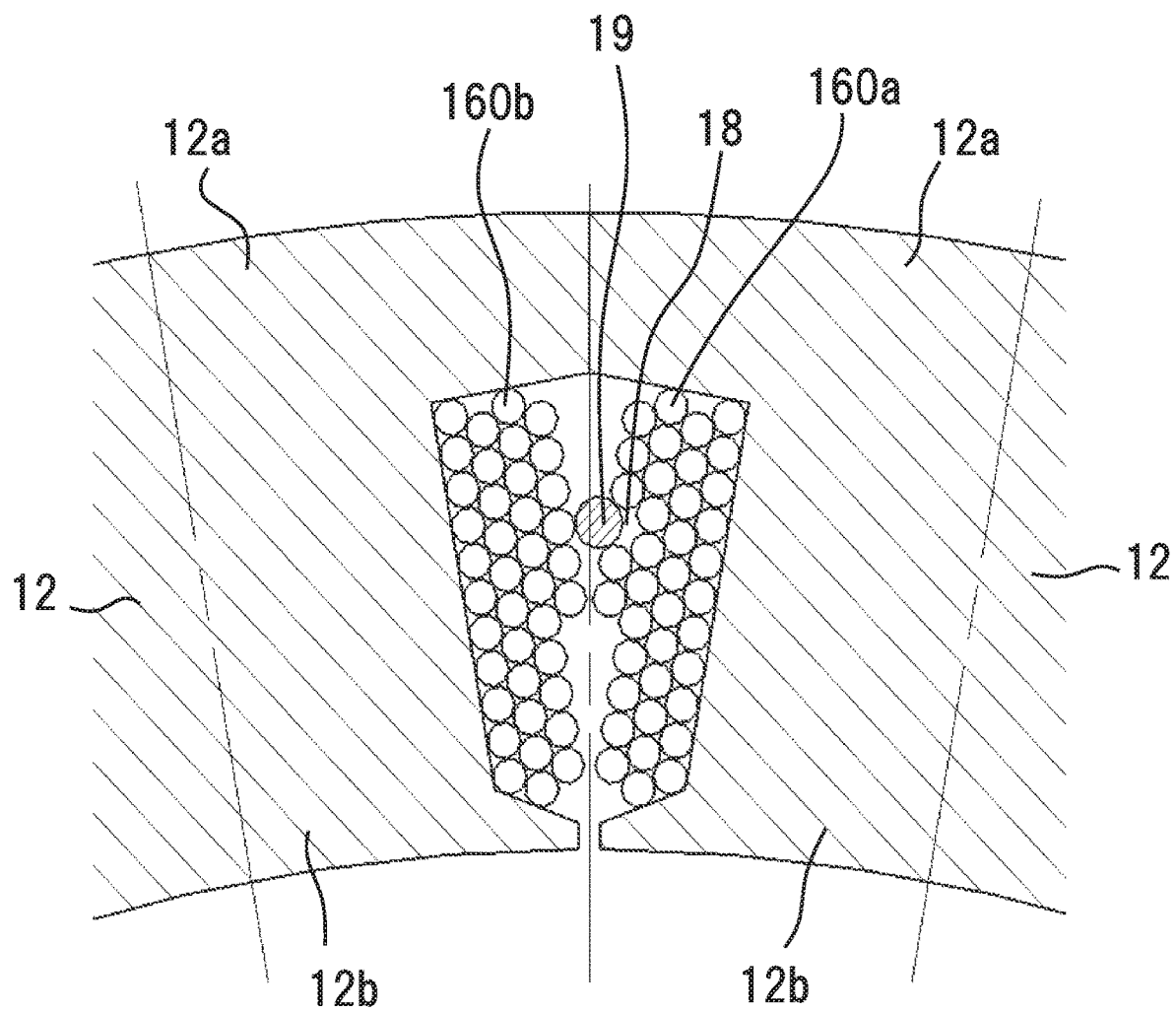
FIG. 8 is a sectional view showing a main part of a coil winding model of the stator of the rotary electric machine according to the first embodiment.
Figure 9A:
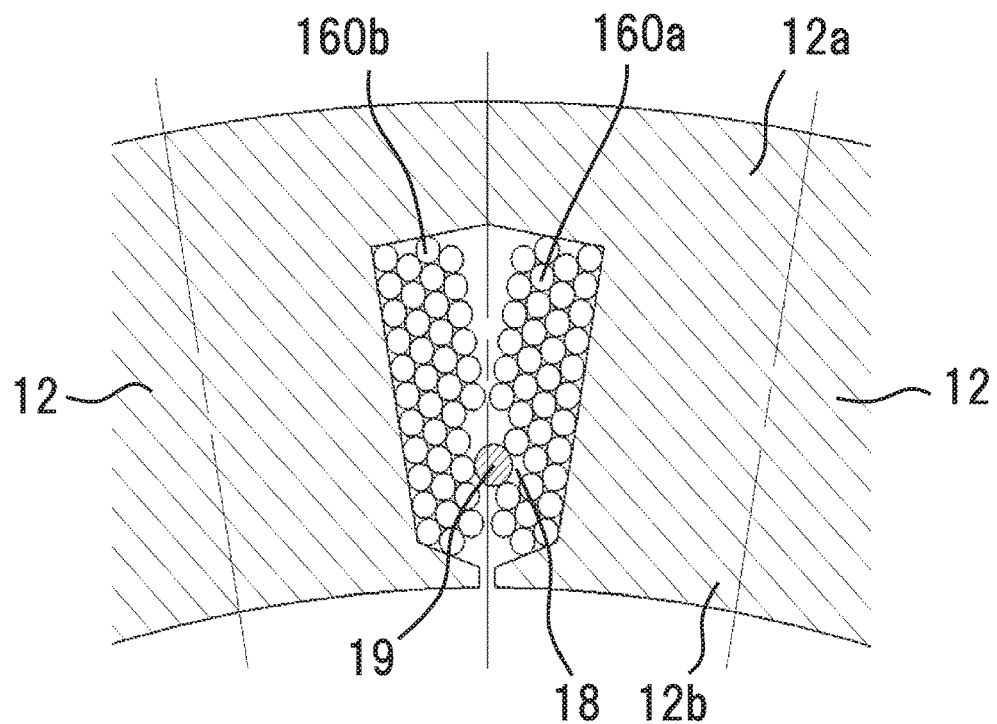
FIGS. 9A and 9B are sectional views showing main parts of the wound coil models of the stator of the rotary electric machine according to the first embodiment.
Figure 9B:
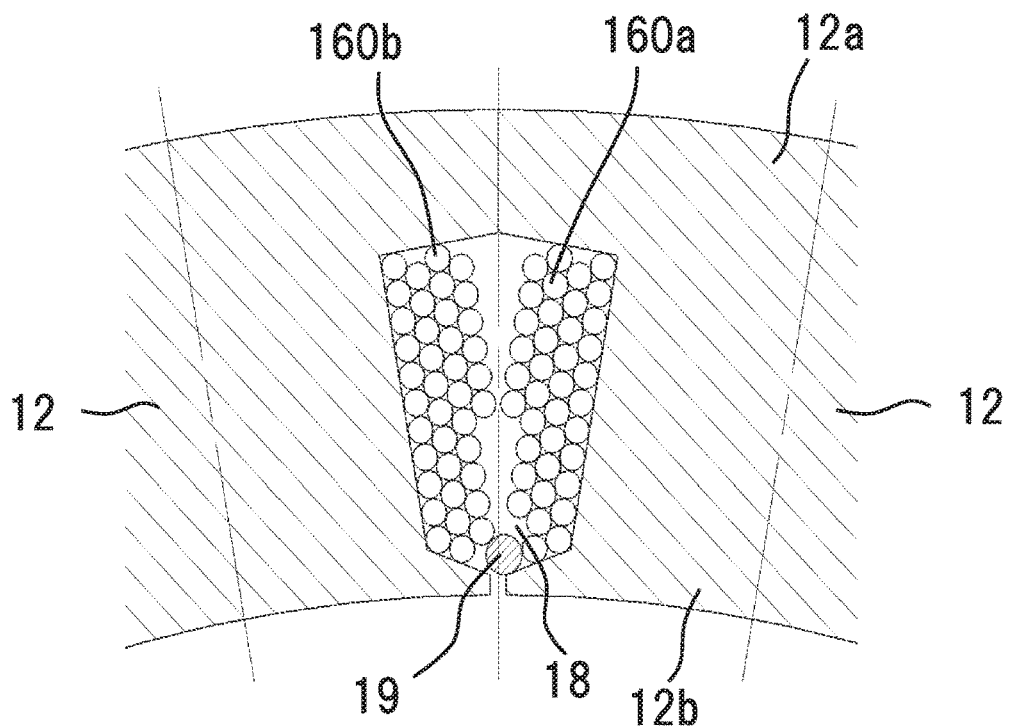

FIG. 1 is a sectional side view showing a main part of one side of the stator 10 of the rotary electric machine 100 according to the first embodiment. FIG. 2 is a perspective view of the stator 10 as viewed from one end side in an axial direction. FIG. 3 is a sectional view along the axial direction of the stator 10. FIG. 4 is a plan view showing one end surface of the stator 10 as viewed from the one end side in the axial direction. FIG. 5 is a perspective view of the stator 10 as viewed from the other end side in the axial direction. FIG. 6 is a perspective view showing a bobbin 14 to be used in the stator 10. FIG. 7 is a perspective view showing a divided iron core 12 wound with the coil 16. FIGS. 8, 9A, and 9B are sectional views of a main part of the stator 10 of the rotary electric machine 100 and show states of holding the temperature measuring element 19 between two coils 16.

As shown in FIG. 1, the rotary electric machine 100 has a housing 1 that is constituted of a frame 2 and an end plate 3. The frame 2 includes a cylindrical part 2a and a bottom 2b, thereby having a cylindrical shape with a bottom, and the frame 2 is made of an aluminum material or other material. The end plate 3 covers an opening of the frame 2. The housing 1 houses the stator 10 and a rotor 5. The stator 10 is inserted and fixed in the cylindrical part 2a of the frame 2. The rotor 5 is firmly fixed to a rotation shaft 6 and is rotatably disposed on an inner circumferential side of the stator 10. The rotation shaft 6 is rotatably supported by the bottom 2b of the frame 2 and the end plate 3 via bearings 4.

The rotor 5 is, for example, a permanent magnet rotor, and includes a rotor core 7 and permanent magnets 8. The rotor core 7 is inserted at an axial center position of the rotation shaft 6 and is firmly fixed to the rotation shaft 6. The permanent magnets 8 are buried in an outer circumferential surface side of the rotor core 7 and are arranged at a predetermined pitch in the circumferential direction, and the permanent magnets 8 constitute magnetic poles.

The rotor 5 is not limited to the permanent magnet rotor and may use a cage rotor or a wound rotor. The cage rotor may include uninsulated rotor conductors that are contained in slots of a rotor core and that are shorted by a short-circuit ring at each side. The wound rotor may include insulated conductors that are fitted to slots of a rotor core.

Next, a structure of the stator 10 is specifically described with reference to FIGS. 2 to 7.

As shown in FIGS. 2 to 5, the stator 10 includes a stator core 11, coils 16 of U phase, V phase, and W phase, and bus rings 25, 26, and 27 for the U phase, the V phase, and the W phase. The stator core 11 is constituted of multiple divided iron cores 12 that are arranged in a circle. The coils 16 are respectively wound around the divided iron cores 12 via both bobbins 14 and 15. The bus rings 25, 26, and 27 are used for connecting the coils 16 of the U phase, the V phase, and the W phase and are adjacently arranged.

The divided iron core 12 is obtained by equally dividing the circular-shaped stator core 11 in the circumferential direction into 18 parts. The divided iron core 12 is made of a predetermined number of electromagnetic steel sheets that are integrally laminated. The divided iron core 12 has a core back part 12a with a circular arc-shaped cross section and has a tooth 12b that protrudes from an inner circumferential wall surface of the core back part 12a toward a radial inside of the core back part 12a. The multiple core back parts 12a are arranged so as to be fitted to an inside of a yoke 13 in a circumferential direction, thereby constructing an iron core cylindrical part as a whole.

The bobbin 14 is made of a resin material such as a PBT resin or a PPS resin so as to have electrical insulating properties. As shown in FIG. 6, the bobbin 14 includes a coil winding part 14a, a flange part 14b that is provided on a radially outward of the coil winding part 14a, and a wall part 14c that is arranged on a radially inward of the core back part 12a relative to bus ring holding parts 20, 21, and 22. The bobbin 14 is disposed on one end surface in the axial direction of the divided iron core 12.

More specifically, as shown in FIGS. 3 and 4, the coil winding part 14a is disposed on one end surface in the axial direction of the tooth 12b, whereas the flange part 14b is disposed on one end surface in the axial direction of the core back part 12a. The bus ring holding parts 20, 21, and 22 are concentrically formed to the flange part 14b so as to have groove shapes and are respectively used for the U phase, the V phase, and the W phase. The bobbin 15 is made of a resin material such as a PBT resin or a PPS resin and is provided with a coil winding part 15a. The bobbin 15 is disposed on the other end surface in the axial direction of the divided iron core 12. More specifically, the coil winding part 15a is disposed on the other end surface in the axial direction of the tooth 12b, as shown in FIGS. 3 and 7.

The bobbins 14 and 15 may be fixed to the divided iron core 12 from a point of view of easiness of winding the coil 16. For example, the bobbins 14 and 15 may be fixed to the divided iron core 12 in an engaging manner or in an adhesive manner using an adhesive material. Alternatively, the bobbins 14 and 15 may be integrally formed with the divided iron core 12 by mold forming.

As shown in FIG. 7, the coil 16 is structured by winding a conductive wire by a predetermined number of turns around the tooth 12b and the coil winding parts 14a and 15a of the bobbins 14 and 15, which are respectively disposed at both end surfaces in the axial direction of the tooth 12b. The conductive wire is an insulation-covered copper round wire, which corresponds to a coil wire. An insulator (not shown) is provided on each side surface in the circumferential direction of the tooth 12b to provide insulation between the coil 16 and the divided iron core 12.

As shown in FIGS. 2 to 5, the 18 divided iron cores 12 that are wound with the coils 16 are circularly arranged while the teeth 12b are radially inwardly directed and side surfaces in the circumferential direction of the core back parts 12a are abutted on each other. In this condition, the 18 divided iron cores 12 are inserted and fixed in the cylindrical yoke 13 by press fitting, shrinkage fitting, or other methods. The yoke 13 is formed by cutting or drawing a metal material of a single component such as iron. However, the yoke 13 may be formed by integrally laminating steel sheets, such as electromagnetic steel sheets.

The coils 16 are wound around the divided iron cores 12 and are circularly arranged repeatedly in the circumferential direction of the stator core 11 in the order of the coil 16 of the U phase, the coil 16 of the V phase, and the coil 16 of the W phase. Each of the coils 16 has an end 16*a* that is led out to the bobbin 14 side. Each of the coils 16 has the other end 16*b* that is led out to the bobbin 15 side.

The bus rings 25, 26, and 27 for the U phase, the V phase, and the W phase are respectively formed by bending a strip-shaped flat sheet made of a material such as oxygen-free copper, deoxidized copper, or tough pitch copper, into a cylindrical shape with a partially open part. As shown in FIGS. 2 and 4, the bus rings 25, 26, and 27 for the U phase, the V phase, and the W phase are respectively fitted and held in the bus ring holding parts 20, 21, and 22 shown in FIG. 6 by being fixed with an adhesive or other material as necessary.

As shown in FIGS. 2 and 4, the end 16*a* of the coil 16 of the U phase is led out in the axial direction to the bobbin 14 side, bent at a right angle, further led out in a radial outward direction of the stator core 11, and connected to a coil connecting part of the bus ring 25 for the U phase. The end 16*a* of the coil 16 of the V phase is led out in the axial direction to the bobbin 14 side, bent at a right angle, further led out in the radial outward direction, and connected to a coil connecting part of the bus ring 26 for the V phase. The end 16*a* of the coil 16 of the W phase is led out in the axial direction to the bobbin 14 side, bent at a right angle, further led out in the radial outward direction, and connected to a coil connecting part of the bus ring 27 for the W phase. The ends 16*a* of the coils 16 of the U phase, the V phase, and the W phase and the coil connecting parts of the bus rings 25, 26, and 27 are respectively electrically connected to each other by means of TIG welding, laser welding, resistance welding, soldering, resistance brazing, or other methods.

As shown in FIG. 5, the ends 16*b* of the coils 16 of the U phase, the V phase, and the W phase, that is, the ends 16*b* of the coils 16 on the common side are led out in the axial direction to the bobbin 15 side, collected together, and electrically connected by means of TIG welding, laser welding, or other methods. The connected part on the common side of the coils 16 of the U phase, the V phase, and the W phase is covered with an insulating tube 17. The connected part on the common side may be covered with a resin mold, an insulating tape, or other insulating material, instead of the insulating tube 17. Although the common side structural parts of the coils 16 of the U phase, the V phase, and the W phase are collected together and are joined by welding or other methods, these common side structural parts may be connected by using bus rings for the common side that are held by bus ring holding parts for the common side formed to the bobbin 15.

The stator 10 thus structured has six three-phase alternating current windings each constituted of the coils 16 of the U phase, the V phase, and the W phase that are Y-connected.

The rotary electric machine 100 is supplied with alternating current at the bus rings 25, 26, and 27 for the U phase, the V phase, and the W phase via an external inverter (not shown). This occurs a rotating magnetic field in the stator 10. The rotating magnetic field generates an attractive force and a repulsive force that cause the rotor 5 to be rotationally driven. The rotary electric machine 100 can be used in an electric motor such as a motor equipped in a household electric appliance and a motor equipped in an industrial machine.

Next, examples of winding the coil 16 so as to have a gap 18 and examples of holding the temperature measuring element 19 are described by using coil winding models in FIGS. 8, 9A, and 9B. The coil 16 includes a first coil 160*a* and a second coil 160*b*.

As shown in the sectional view of the main part of the stator 10 in FIG. 8, one divided iron core 12 that is positioned on a right side in FIG. 8 is wound with the first coil 160*a* of one of the coils 16, whereas another divided iron core 12 that is positioned on a left side in FIG. 8 adjacent to the one divided iron core 12 is wound with the second coil 160*b* of another of the coils 16. FIGS. 8, 9A, and 9B show cross sectional structures in which the temperature measuring element 19 is disposed at facing parts of the first coil 160*a* and the second coil 160*b*.

In the example of the coil winding model in FIG. 8, a gap 18 is provided to a surface part of the wound coil of the first coil 160*a*, which faces the second coil 160*b*. This surface part functions as a surface part for holding the temperature measuring element 19. The gap 18 is formed by skipping winding the coil wire of the first coil 160*a* by one turn at a fourth stage that is the uppermost layer of the wound coil wound in a staggered arrangement. The uppermost layer functions as an outer surface of the first coil 160*a* and is an adjacent layer facing the adjacent second coil 160*b*. The gap 18 is shaped by making a recess along the axial direction on a part of the outer surface of the first coil 160*a*. The part in which the coil wire is not wound at the outer surface of the first coil 160*a*, that is, at the surface part of the wound coil 16, corresponds to the gap 18. The gap 18 is provided so as to have the same width in the axial direction, for example. The gap 18 causes exposure of the coil wire that is wound one stage under the outer surface of the first coil 160*a*.

The coil winding model is exemplified in the present application to describe the winding manner of the coil 16, and it is obvious that the number of turns of winding of the coil wire can differ from that actually used.

The gap 18 is easily formed as follows. For example, after the coil wire is wound and reaches a part to be formed with the gap 18, during winding the coil wire around the tooth 12*b*, a spacer is disposed at this part, and the coil wire is then wound so as to hold the spacer. The spacer has a dimension corresponding to a width of the turn that is skipped. The spacer is removed after the coil wire is wound.

In another example, it is possible to form the gap 18 without using the spacer or another component such that the coil wire is obliquely wound at a desired angle relative to a regular winding direction before reaching an area to be formed with the gap 18 during winding. The width of the gap 18 is adjusted in accordance with the oblique angle, and thus, winding of the coil wire is skipped by a predetermined width on the outer surface of the coil 16.

The temperature measuring element 19 is inserted in the gap 18 of the first coil 160*a*. The temperature measuring element 19 has a diameter greater than that of the coil wire, and thus, the temperature measuring element 19 is disposed in contact with the coil wire of the outer surface of the first coil 160*a* at each end of the gap 18. The temperature measuring element 19 is brought into contact with both of the two coils 16 that face each other, that is, both of the first coil 160*a* and the second coil 160*b*.

The coil wire is densely wound in an area other than the area of the gap 18 in the outer surface of the first coil 160*a*. That is, the coil wire is wound next so that an outer circumference of the coil wire will be partially brought into contact with an outer circumference of the coil wire that is already wound.

The outer surface of the coil 16 is made by stacking the coil wire higher in a part in which the temperature measuring element 19 is not disposed than in the part in which the temperature measuring element 19 is disposed. This structure improves the space factor.

The layer of the outer surface of the coil 16, that is, an adjacent layer, is a surface part of the coil 16 facing the adjacent coil 16. This layer may include a part other than the outermost layer of the coil wire that is wound around the tooth 12b at the highest stage.

As shown in the examples in FIGS. 8, 9A, and 9B, whereas a stacking height of the coil wire increases on a side close to the core back part 12a of the tooth 12b because a greater space for winding the coil wire is obtained as a distance to the shaft increases, the stacking height of the coil wire decreases on a side away from the core back part 12a of the tooth 12b. That is, whereas the coil wire is wound in a four-stage staggered arrangement on the side close to the core back part 12a of the tooth 12b, the coil wire is wound in a three-stage staggered arrangement on the side away from the core back part 12a of the tooth 12b, resulting in decrease of one stage compared with the area close to the core back part 12a of the tooth 12b. Thus, the layer of the outer surface of the coil 16 that is wound on the side away from the core back part 12a of the tooth 12b includes a layer of which the stage number of the coil wire wound in the staggered arrangement is small. It is possible to improve the space factor by appropriately adjusting the number of the stages of winding in accordance with a space between the pair of the adjacent teeth 12b.

In the example in FIG. 9A, the temperature measuring element 19 is disposed on a tip side of the tooth 12b away from the core back part 12a. In this coil winding model, the gap 18 is formed by skipping winding a third layer from the tip of the tooth 12b of a third stage functioning as the outer surface of the first coil 160a, to generate a space, and the temperature measuring element 19 is set in this gap 18. This third stage is an area in which the number of stages of the coil wire wound in the staggered arrangement is not maximum. The winding of the coil wire is skipped by a width corresponding to the diameter of one coil wire.

FIGS. 8 and 9A show examples of disposing the temperature measuring element 19 in an area other than an end part of the coil 16, more exactly, an end part on the tip side of the tooth 12b. However, as in another example of the coil winding model shown in FIG. 9B, it is also possible to dispose the temperature measuring element 19 in the gap 18 that is provided to the outer surface of the first coil 160a at a position closest to the tip of the tooth 12b. In the case in FIG. 9B, one part of each of the first coil 160a and the second coil 160b is brought into contact with the temperature measuring element 19. The coil 19 and the temperature measuring element 19 may be fixed by an adhesive such as a silicone adhesive or an epoxy adhesive to reliably bring them into contact with each other.

The coil 16 generates heat that is transmitted primarily through the iron core. In view of this, the temperature measuring element 19 is desirably disposed on the outer surface of the coil 16 to measure the temperature because the outer surface of the coil 16 is away from the iron core and thereby tends to increase in temperature. For this reason, the structure of the present application as shown in FIG. 8, 9A, or 9B enables disposition of the temperature measuring element 19 on the outer surface of the coil 16 and is suitable for measuring temperature of the coil 16.

The examples described above have the structure in which the temperature measuring element 19 is brought into contact with the pair of the coils 16, which are the first coil 160a and the second coil 160b. However, it is also possible to correctly measure the temperature of the coil 16 in the structure in which the temperature measuring element 19 is brought into contact with one of the coils 16, and the other coil 16 is disposed around the temperature measuring element 19 in a noncontact manner.

The pair of the adjacent coils 16 have a space in which the coil wire is not wound around the gap 18 for containing the temperature measuring element 19. This space is adjusted so that the temperature measuring element 19 will not come off from the gap 18 and will not deviate in the gap 18.

Thus, in the rotary electric machine 100 according to the first embodiment of the present application, the gap 18 is formed by winding the coil wire so as to generate a space at at least one part of one or both of the adjacent layers of the pair of the adjacent coils 16, which are the first coil 160a and the second coil 160b, and the temperature measuring element 19 is disposed in the gap 18.

The first embodiment provides effects as described below.
(1) Disposing the temperature measuring element 19 in contact with the coil 16 enables easy positioning of the temperature measuring element 19, thereby improving the assembling characteristic.
(2) Disposing the temperature measuring element 19 in contact with the coil 16 enables fixing the position of the temperature measuring element 19, thereby decreasing variation in temperature measurement and improving the measurement accuracy.
(3) Disposing the coil 16 around the temperature measuring element 19 enables measuring temperature of the coil 16 at a higher accuracy because the temperature in the vicinity of the temperature measuring element 19 comes close to the temperature of the coil 16.
(4) The coil wire is stacked higher in the area other than the gap 18 in which the temperature measuring element 19 is disposed than in the gap 18. This increases the number of turns of winding compared with that of winding in an ordinary staggered arrangement, thereby increasing the space factor.
(5) The gap 18 is formed such that the coil wire is wound in the staggered arrangement around the outside of the tooth 12b by skipping winding the coil wire by a width of at least one coil wire on the outer surface of the coil 16, thereby making a recess on a part of the outer surface of the coil 16. The coil 16 is, for example, the first coil 160a. Thus, the gap 18 is formed without using a special tool or an additional part, whereby the productivity is improved.

It is obvious that effects similar to those described above are obtained also in cases such as the coil wire uses a rectangular copper wire, and the temperature measuring element 19 has a rectangular parallelepiped shape.

Second Embodiment

Figure 10:
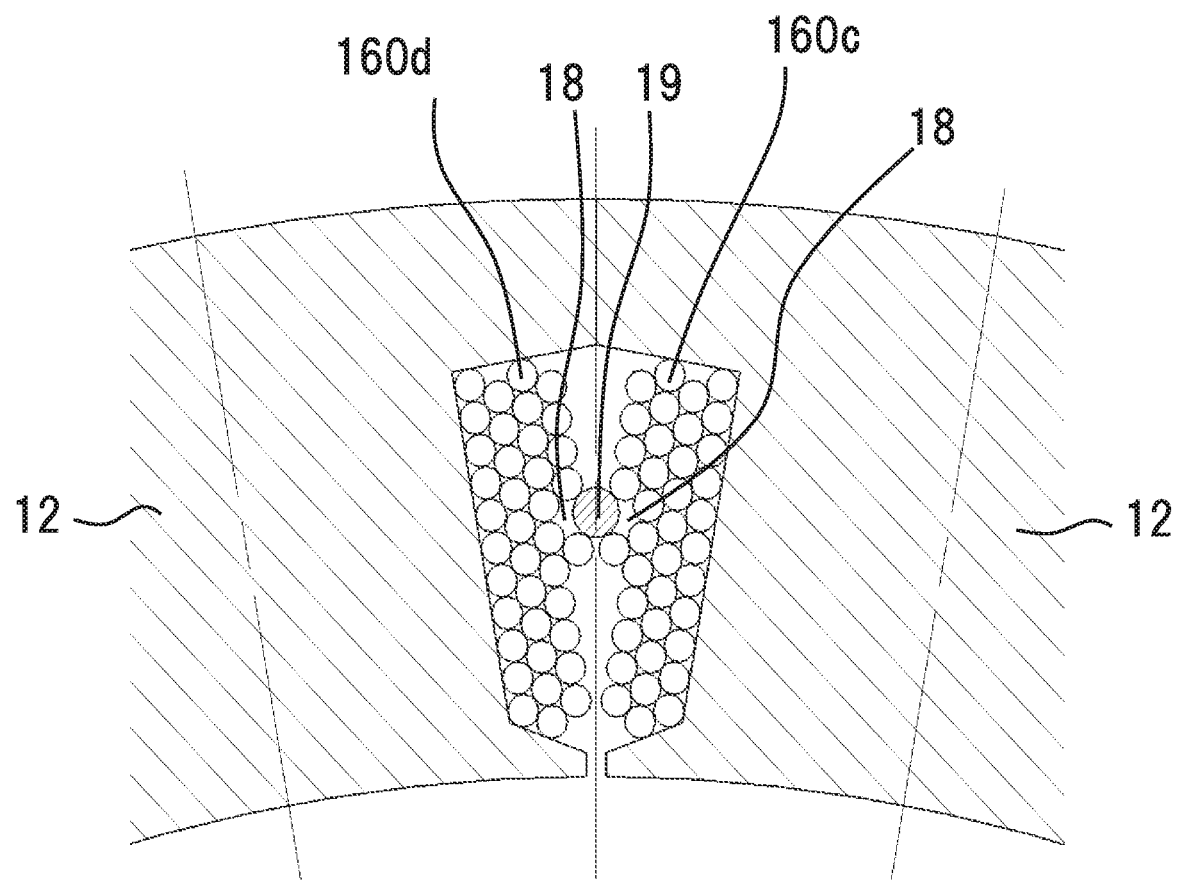
FIG. 10 is a sectional view showing a main part of a coil winding model of the stator of the rotary electric machine according to a second embodiment.

FIG. 10 is a sectional view showing a main part of a coil winding model of the stator 10 of the rotary electric machine 100 according to a second embodiment. In the example of the first embodiment, the gap 18 is provided only on the first coil 160a side, and the gap 18 is not provided to the second coil 160b that faces the first coil 160a. On the other hand, in the second embodiment, the gap 18 is provided to a surface part of the wound coil of a first coil 160c, and another gap 18 is also provided to a surface part of the wound coil, that is, a surface part facing the coil, of a second coil 160d that faces the first coil 160c as in the case of the first coil 160c. The gap 18 of the first coil 160c and the gap 18 of the second coil 160d are symmetrically arranged to have a space therebetween, in which the temperature measuring element 19 is inserted.

As in the case of the first embodiment, it is obvious that the gap 18 can be provided in an area other than the area of the uppermost layer of the coil 16 at the highest stage of winding, in the second embodiment.

Thus, the rotary electric machine 100 according to the second embodiment has the temperature measuring element 19 that is disposed in the space formed by the two gaps 18. The gaps 18 are respectively provided at symmetrical positions of the facing outer surfaces of the pair of the adjacent coils 16, which are the first coil 160c and the second coil 160d.

The second embodiment provides an effect as described below.

(1) At least two coils 16 are brought into contact with the outer circumference of the temperature measuring element 19, and thus, the temperature in the vicinity of the temperature measuring element 19 comes close to the temperatures of the coils 16. This structure enables measuring temperature of the coil 16 at a higher accuracy.

Third Embodiment

Figure 11:
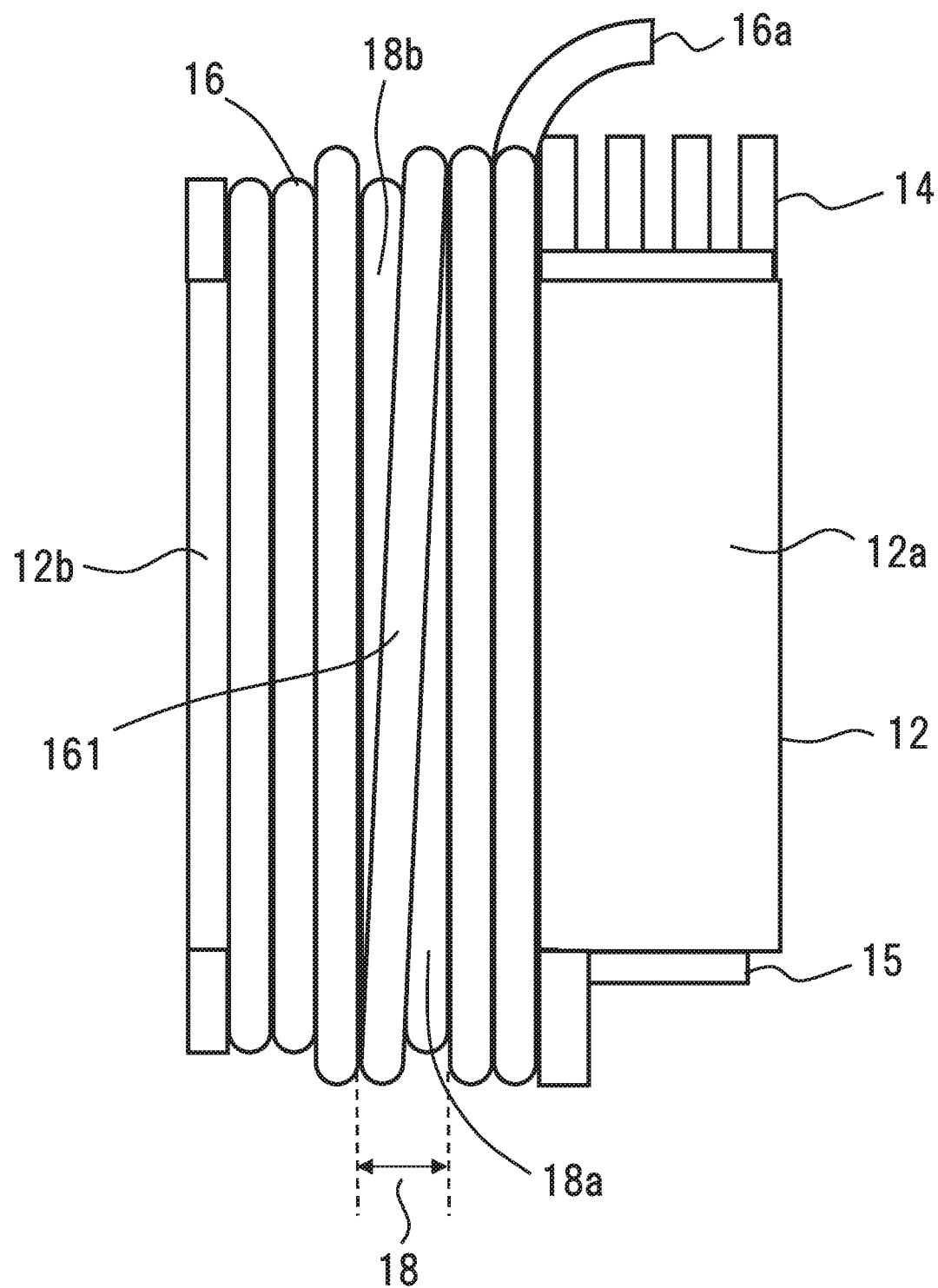
FIG. 11 is a side view showing the divided iron core of the stator of the rotary electric machine according to a third embodiment.

FIG. 11 is a side view of the divided iron core 12 of the rotary electric machine 100 according to a third embodiment. As shown in FIG. 11, the coil 16 that is wound around the tooth 12b has a long-side crossing part 161 at the gap 18 of the outer surface. The long-side crossing part 161 is wound so as to cross along the long side of the outer surface of the coil 16. The tooth 12b has a rectangular cross section along the coil winding direction. The coil wire is wound in the axial direction on the long-side side and faces an adjacent coil 16. The coil wire is wound so as to cross the axial direction on the short-side side. The long-side crossing part 161 that is provided in the gap 18 divides the gap 18 into two spaces 18a and 18b. As shown in FIG. 11, the gap 18 has a rectangular plane shape with a width corresponding to at least two coil wires, and the long-side crossing part 161 is obliquely arranged relative to the rectangular shape. The long-side crossing part 161 is linearly provided so as to be oblique at a predetermined angle to the axial direction, which is a regular winding direction. The spaces 18a and 18b that are divided by the long-side crossing part 161 respectively have plane shapes of long narrow right triangles that face different directions. In the example in FIG. 11, the space 18a is provided so that the width will decrease from an end to the other end, that is, from a lower end to an upper end, of the surface part of the wound coil, whereas the space 18b is provided so that the width will gradually decrease from an end to the other end, that is, from an upper end to a lower end, of the surface part of the wound coil. That is, in the condition in which the inserting direction of the temperature measuring element 19 is the axial direction, the spaces 18a and 18b are formed so as to gradually decrease in dimension along the inserting direction of the temperature measuring element 19.

The tooth 12b has a rectangular cross section along the axial direction, which has a long side and a short side. The coil 16 is wound along the outer circumference of the rectangular shape. Thus, to form the gap 18 in forming the coil 16, a space must be provided between two coil wires that are sequentially wound, by skipping winding the coil wire at either part of the outer circumferential surface. For this reason, as shown in FIG. 11, the coil wire is arranged in the crossing manner on one of the four outer circumferential surfaces of the tooth 12b to skip winding the coil 16. In the first embodiment and the second embodiment, whether the coil wire is arranged in the crossing manner in the gap 18 is not important as long as the gap 18 is provided for disposing the temperature measuring element 19. On the other hand, in the third embodiment, the gap 18 of the coil 16 is divided by the long-side crossing part 161 to form the spaces 18a and 18b respectively at both sides in the width direction of the long-side crossing part 161.

Figure 12:
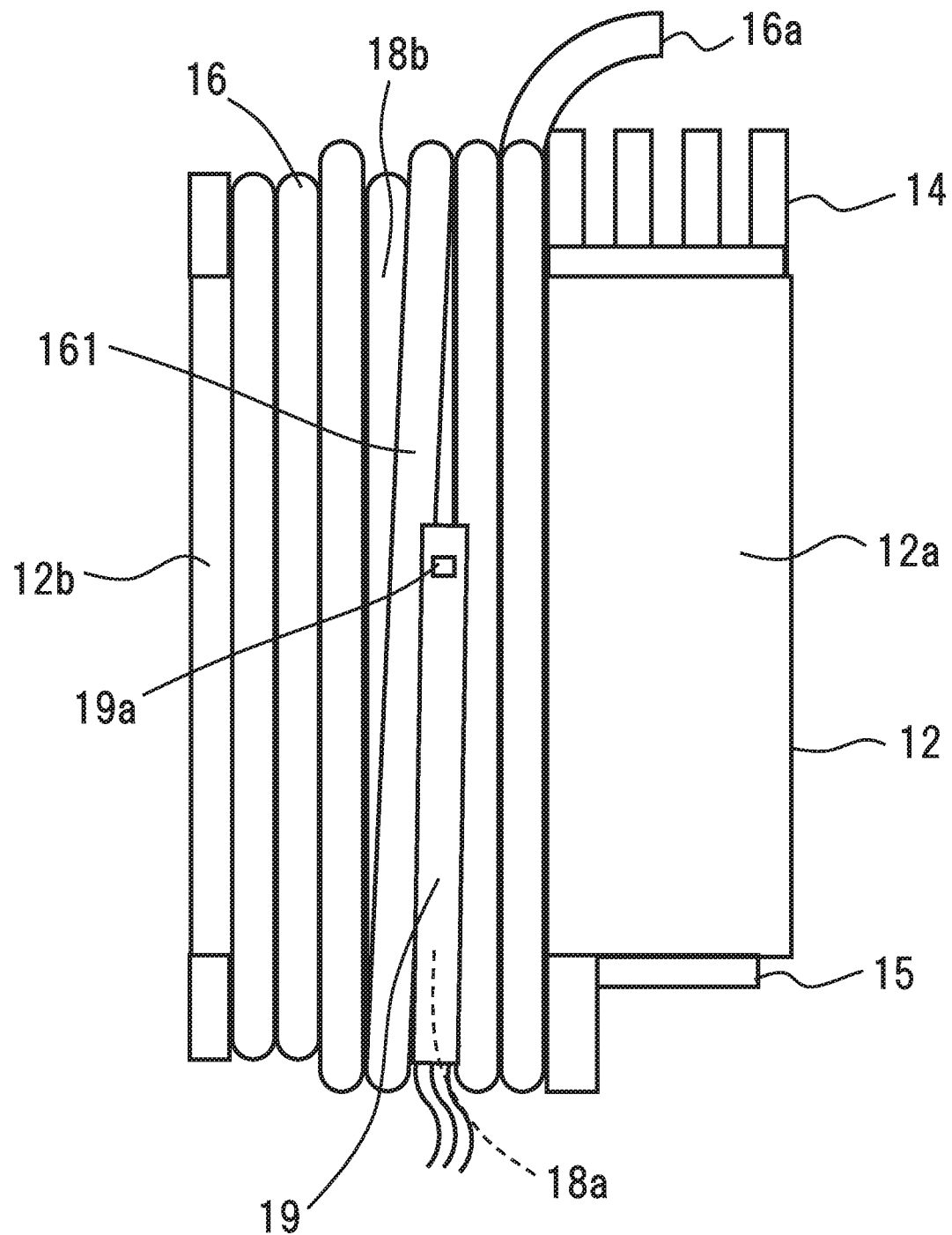
FIG. 12 is a side view showing a state of disposing a temperature measuring element to the divided iron core of the stator of the rotary electric machine according to the third embodiment.

FIG. 12 is a side view of the stator 10 of the rotary electric machine 100 according to the third embodiment and shows a state of disposing the temperature measuring element 19 to the divided iron core 12 wound with the coil 16. The temperature measuring element 19 is disposed in the gap 18 from an end toward the other end of the surface part that faces the coil 16, that is, from a lower side toward an upper side in FIG. 12. The space 18a has the width that gradually decreases from a front side toward a depth side along the inserting direction. The temperature measuring element 19 includes a temperature sensing part 19a. The temperature sensing part 19a is, for example, disposed on a tip side of the tubular temperature measuring element 19. The tip side of the temperature measuring element 19 that is provided with the temperature sensing part 19a is disposed on the deep side in which the space 18a has a small width, whereby tightness between the tip side of the temperature measuring element 19 and the coil 16 is improved.

Thus, in the third embodiment, the long-side crossing part 161 is wound at one part of the adjacent layer of the outer surface of the coil 16 to provide the space 18a or 18b so that the width will gradually decrease along the axial direction, and the temperature measuring element 19 is inserted and is secured in the space 18a or 18b.

The long-side crossing part 161 is provided in the gap 18 of the coil 16, on one or both of the facing surface parts of the wound coils of the two coils 16. This structure provides advantageous effects compared with a structure in which the crossing part is provided on the short-side side of the rectangular cross section of the tooth 12b. As shown in FIG. 11, in the case of forming the space 18a by using the long-side crossing part 161, the length in the axial direction of the space 18a depends on the length of the long side of the rectangular shape of the tooth 12b and is thereby longer than the length of the short side of the rectangular shape. Thus, in the condition in which the temperature measuring element 19 is inserted from an end of the space 18a, a contact area between the coil wire and the temperature measuring element 19 is sufficiently obtained, thereby enabling more stably holding the temperature measuring element 19 and measuring the temperature correctly.

The third embodiment provides effects as described below.

(1) Disposing the temperature measuring element 19 in the space 18a or 18b of which the width gradually decreases enables easy positioning in the axial direction of the temperature measuring element 19, thereby improving the assembling characteristic.

(2) Disposing the temperature measuring element 19 in the space 18a or 18b of which the width gradually decreases reliably makes the temperature measuring element 19 and the coil 19 in close contact with each other, thereby enabling measuring temperature of the coil 16 at a higher accuracy.

(3) Disposing the temperature sensing part 19a of the temperature measuring element 19 on the deep side in which the space 18a or 18b has a small width enables measuring the temperature of the coil 16 at a higher accuracy.

In the case of providing the space 18*a* or 18*b* to one of the coils 16 that face each other, the other coil 16 may not be provided with the gap 18 (first pattern), the other coil 16 may be provided with the gap 18 with a constant width (second pattern), or the other coil 16 may be provided with the space 18*a* or 18*b* (third pattern). In the second pattern, the temperature measuring element 19 is inserted on the coil 16 side by using the gap 18 with the constant width as a guide groove, while the tightness between the coil 16 and the temperature measuring element 19 is improved in the space 18*a*.

Fourth Embodiment

Figure 13A:
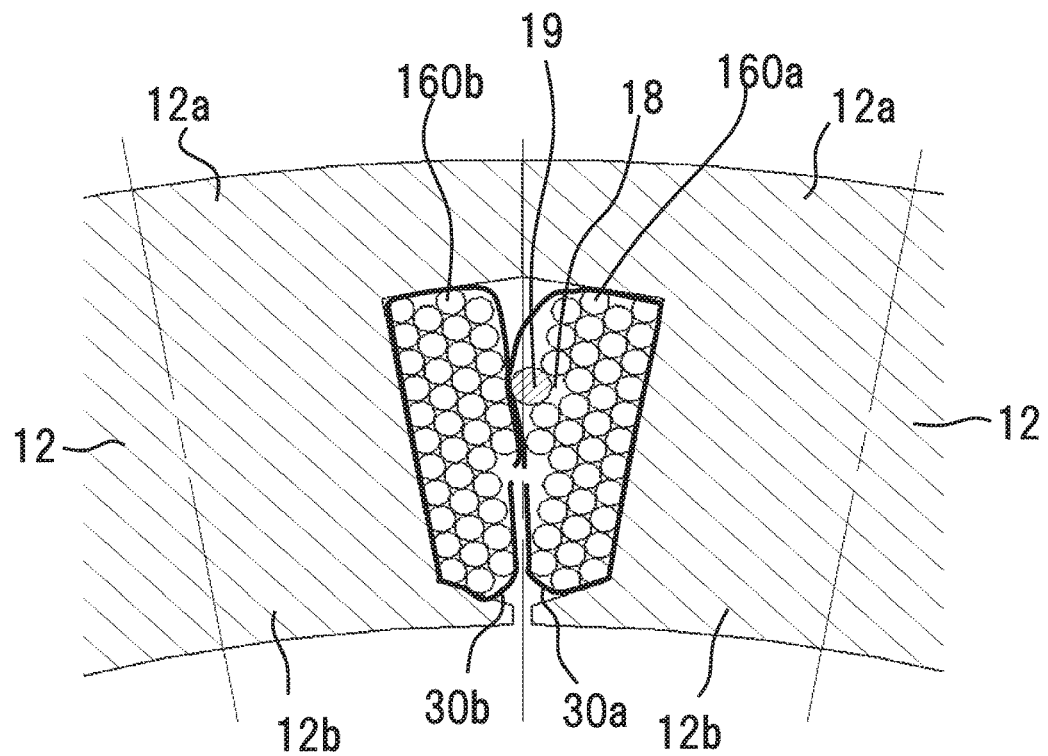
FIGS. 13A and 13B are sectional views showing main parts of the wound coil models of the stator of the rotary electric machine according to a fourth embodiment.
Figure 13B:
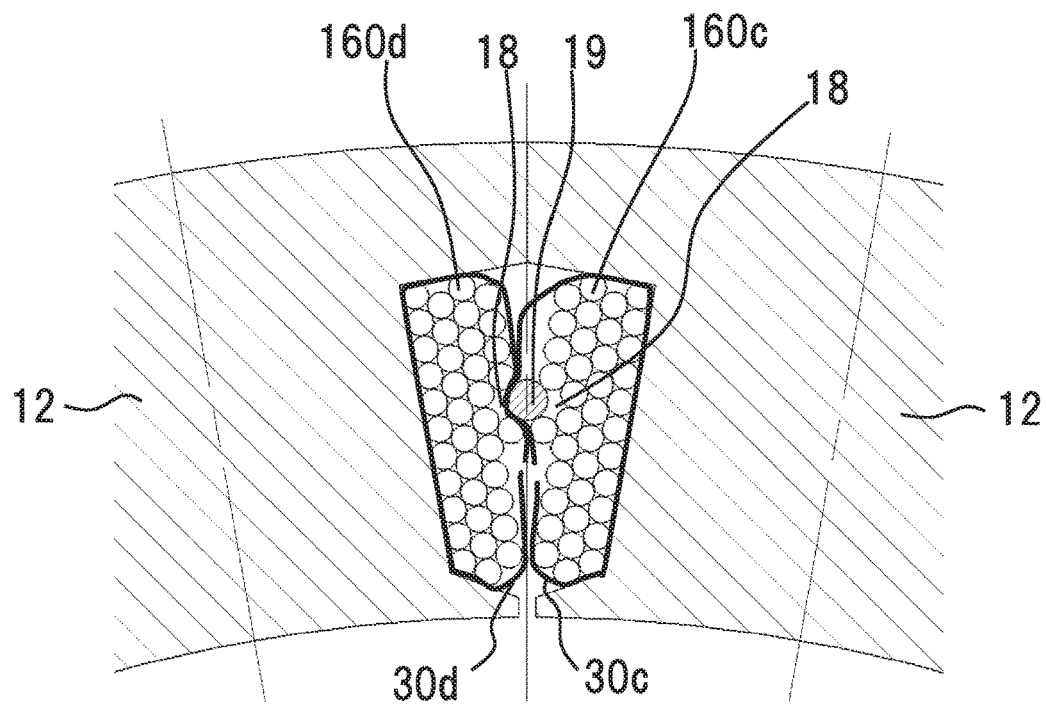

FIGS. 13A and 13B are sectional views showing main parts of the wound coil models of the stator 10 of the rotary electric machine 100 according to a fourth embodiment. FIG. 13A shows a structure of providing insulating members 30*a* and 30*b* surrounding the coils 16 in the structure in FIG. 8. FIG. 13B shows a structure of providing insulating members 30*c* and 30*d* in the structure in FIG. 10.

As shown in FIG. 13A, the temperature measuring element 19 is directly brought into contact with the first coil 160*a* while the first coil 160*a* of one of the coils 16 and the temperature measuring element 19 are surrounded by the one insulating member 30*a*, and the temperature measuring element 19 is indirectly brought into contact with the second coil 160*b* via the insulating members 30*a* and 30*b* while the second coil 160*b* of the other coil 16 is surrounded by the other insulating member 30*b*.

These insulating members 30*a* and 30*b* are, for example, insulating papers. The insulating papers are bent and compressed due to elasticity, and thus, the temperature measuring element 19 is pressed against the second coil 160*b* while also being pressed against the first coil 160*a*.

As shown in FIG. 13B, the temperature measuring element 19 is directly brought into contact with the first coil 160*c* while the first coil 160*c* of one of the coils 16 and the temperature measuring element 19 are surrounded by the one insulating member 30*c*, and the temperature measuring element 19 is indirectly brought into contact with the second coil 160*d* via the insulating members 30*c* and 30*d* while the second coil 160*d* of the other coil 16 is surrounded by the other insulating member 30*d*. Moreover, due to the gap 18 provided to the outer surface of the second coil 160*d*, the insulating members 30*c* and 30*d* are bent at supporting points on the two coil wires adjacent to the gap 18. Thus, the temperature measuring element 19 is pressed against the second coil 160*d* and at the same time pressed against the first coil 160*c*.

In one embodiment of the insulating members 30*a* and 30*b* or the insulating members 30*c* and 30*d* as shown in FIG. 13A or 13B, one of the coils 16 and the temperature measuring element 19 may be unified in the condition in which the temperature measuring element 19 is set to the one coil 16, and a surface of this structure may be entirely covered with the insulating member 30*a* or 30*c*. In addition, for example, the surface part of the adjacent other coil 16 may be entirely covered with the another insulating member 30*b* or 30*d*.

In the structure in which the insulating members 30*a* and 30*b* or the insulating members 30*c* and 30*d* are provided, for example, the temperature measuring element 19 is brought into contact with both of the two coils 16 such that the temperature measuring element 19 is indirect contact with one of the coils 16 and is in indirect contact with the other coil 16 via the insulating members 30*a* and 30*b* or the insulating members 30*c* and 30*d*.

It is obvious that the insulating member is able to be used by appropriately changing an area for providing the insulating member, the material, and the thickness depending on a product specification.

Thus, in the structure according to the fourth embodiment, the insulating members 30*a* and 30*b* or the insulating members 30*c* and 30*d* are provided, thereby pressing the temperature measuring element 19 to the gap 18 of the coil 16 while insulating the coils 16. This structure reliably makes the temperature measuring element 19 in close contact with the coils 16.

FIG. 13A shows the example of surrounding the two coils 16 with the respective insulating members 30*a* and 30*b*. FIG. 13B shows the example of surrounding the two coils 16 with the respective insulating members 30*c* and 30*d*. However, it is also possible to obtain electric insulation by disposing the insulating members 30*a* and 30*b* or the insulating members 30*c* and 30*d* so as to cover at least the facing surface parts of the coils 16.

Alternatively, the insulating member 30*a* or 30*b* or the insulating member 30*c* or 30*d* may be disposed to only one of the two coils 16, and no insulating member may be disposed to the other coil 16.

In the above-described example, the temperature measuring element 19 and the coil 16 are unified by surrounding with the insulating member 30*a* or 30*c* in the condition in which the temperature measuring element 19 is set to one of the coils 16. However, the temperature measuring element 19 may not be unified with the coil 16. That is, one of the coils 16 may be surrounded by the insulating member 30*a* or 30*c*, the other coil 16 may be surrounded by the insulating member 30*b* or 30*d*, and the temperature measuring element 19 may be interposed between the two insulating members 30*a* and 30*b* or the two insulating members 30*c* and 30*d*. This structure makes both of the two coils 16 have equal degree of tightness to the temperature measuring element 19.

Thus, the rotary electric machine 100 according to the fourth embodiment includes the insulating members 30*a* and 30*b* or the insulating members 30*c* and 30*d* that are interposed between one of the coils 16 with the gap 18 in which the temperature measuring element 19 is disposed and the facing other coil 16 that is provided to face the gap 18.

The fourth embodiment provides effects as described below.

(1) The temperature measuring element 19 is pressed against the coil 16 and is reliably brought into close contact with the coil 16 due to the elasticity of the insulating members 30*a* and 30*b* or the insulating members 30*c* and 30*d*, thereby enabling measuring temperature of the coil 16 at a higher accuracy.

(2) The temperature measuring element 19 is pressed against the coil 16 and is stably held due to the elasticity of the insulating members 30*a* and 30*b* or the insulating members 30*c* and 30*d*, thereby enabling a correct temperature measurement.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotary electric machine comprising: a stator having a cylindrical shape and including an iron core cylindrical part, multiple teeth that radially inwardly protrude from an inner circumferential wall surface of the iron core cylindrical part; a rotor coaxially disposed with the stator on an inner circumferential side of the stator; and a temperature measuring element that measures temperature of coils respectively wound around the teeth of the stator, wherein the coil wound around one of the multiple teeth is provided with a gap by making a recess on a part of an outer surface of the coil, and the temperature measuring element is disposed in the gap, wherein the coils includes a first coil having the gap and a second coil that is provided adjacent to the first coil so as to face the gap, and the second coil has another gap that is formed by making a recess on a part of an outer surface facing the gap of the first coil, and the temperature measuring element is disposed in the other gap of the second coil.

2. The rotary electric machine according to claim 1, wherein the temperature measuring element is disposed in contact with both of the first coil and the second coil.

3. The rotary electric machine according to claim 2, wherein an insulating member is interposed between one of the first coil and the second coil, in which the temperature measuring element is disposed in the gap, and facing another of the first coil or the second coil that is provided so as to face the gap.

4. The rotary electric machine according to claim 1, wherein the gap is provided so as to have the same width in an axial direction, and a coil wire constituting the coil is not wound on an outer surface of the coil in the gap.

5. A manufacturing method for manufacturing the rotary electric machine according to claim 1, the manufacturing method comprising:

forming the gap by making the recess on the part of the outer surface of the coil, the recess being formed by skipping winding the coil wire by a width of at least one coil wire on the outer surface of the coil in winding the coil wire in a staggered arrangement around an outside of the tooth; and inserting and securing the temperature measuring element in the gap.

6. A rotary electric machine comprising: a stator having a cylindrical shape and including an iron core cylindrical part, multiple teeth that radially inwardly protrude from an inner circumferential wall surface of the iron core cylindrical part; a rotor coaxially disposed with the stator on an inner circumferential side of the stator; and a temperature measuring element that measures temperature of a coil wound around the teeth of the stator, wherein the coil wound around one of the multiple teeth is provided with a gap by making a recess on a part of an outer surface of the coil, and the temperature measuring element is disposed in the gap, wherein each of the teeth have a rectangular cross section, the coil is wound around an outside of the rectangular shape, a coil wire that constitutes the coil is wound in at least one of the gaps in a crossing manner to divide the gap into two spaces, and the temperature measuring element is disposed in one of the spaces.

7. The rotary electric machine according to claim 6, wherein one of the first and second coils of the coil that are provided in adjacent to each other on adjacent teeth is provided with the space in the gap, and the other coil portion is provided with the other gap that has the same width in an axial direction.

8. The rotary electric machine according to claim 6, wherein the space has a width that gradually decreases from a front side toward a depth side along an inserting direction of the temperature measuring element, and the temperature measuring element has a temperature sensing part that is disposed on the depth side of the space.

9. The rotary electric machine according to claim 6, wherein each of the teeth have a rectangular cross section with a long side and a short side, and the space is provided on the long-side side.

* * * * *